US012472607B2

(12) United States Patent
Li

(10) Patent No.: US 12,472,607 B2
(45) Date of Patent: Nov. 18, 2025

(54) THERMOSTATIC CARTRIDGE EXTRACTION TOOL

(71) Applicant: AS America, Inc., Piscataway, NJ (US)

(72) Inventor: Hsiao Chang Li, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 319 days.

(21) Appl. No.: 18/189,037

(22) Filed: Mar. 23, 2023

(65) Prior Publication Data

US 2023/0311283 A1 Oct. 5, 2023

Related U.S. Application Data

(60) Provisional application No. 63/325,699, filed on Mar. 31, 2022.

(51) Int. Cl.
*B25B 27/02* (2006.01)

(52) U.S. Cl.
CPC .................................. *B25B 27/023* (2013.01)

(58) Field of Classification Search
USPC ............................................ 81/176.15, 176.2
See application file for complete search history.

(56) References Cited

U.S. PATENT DOCUMENTS

| | | | | | |
|---|---|---|---|---|---|
| 2,589,935 | A | * | 3/1952 | Guisti | B25B 13/483 81/125 |
| 3,371,563 | A | * | 3/1968 | Lallo | B25B 27/0042 81/124.2 |
| 3,618,428 | A | * | 11/1971 | Phipps | B25B 27/0042 81/125 |
| 3,785,225 | A | * | 1/1974 | McKenna | B25B 27/0042 D8/21 |
| 3,837,242 | A | * | 9/1974 | Harper | B25B 27/0042 81/3.09 |
| 4,016,783 | A | * | 4/1977 | Spector | B25B 13/48 81/125 |
| 4,697,480 | A | * | 10/1987 | Robideau | B67B 7/18 81/3.4 |
| D293,819 | S | * | 1/1988 | Alvi | D24/224 |
| 4,726,264 | A | * | 2/1988 | Bost | B67B 7/02 81/3.4 |
| D301,197 | S | * | 5/1989 | McClung | D8/33 |
| 5,400,680 | A | * | 3/1995 | Spangler | B25B 13/48 81/461 |
| 11,203,856 | B2 | | 12/2021 | Li et al. | |

* cited by examiner

*Primary Examiner* — Jason L Vaughan
(74) *Attorney, Agent, or Firm* — Morrison & Foerster LLP

(57) ABSTRACT

Provided are extraction tools for removing a thermostatic cartridge from a valve assembly. The extraction tool comprises a cap having an opening and a screw, wherein the cap is configured to receive the screw at the opening. Further, when the extraction tool is placed over a portion of a thermostatic cartridge installed in a valve assembly, an end of the screw is configured to screw into an opening of the thermostatic cartridge.

13 Claims, 9 Drawing Sheets

THERMOSTATIC CARTRIDGE EXTRACTION TOOL

CROSS-REFERENCE TO RELATED APPLICATIONS

This application claims the priority of U.S. Provisional Application No. 63/325,699, filed Mar. 31, 2022, the entire contents of which is incorporated herein by reference.

FIELD

The present disclosure generally relates to cartridge removal tools, and more particularly, to thermostatic cartridge removal tools.

BACKGROUND

Plumbing assemblies utilize cartridges to control the flow of water from a water source through to the water faucet, spout, or showerhead. Over time, these cartridges can start leaking and need to be replaced. However, they are often very tightly positioned within a plumbing assembly and can be difficult to remove due to mineral buildup. Further, cartridges are oftentimes located in small spaces, making is difficult for a person to access and manipulate with conventional tools.

Thermostatic cartridges are used in thermostatic valves to mix hot inlet water and cold inlet water to a predetermined mixed temperature. Thus, thermostatic cartridges can provide a consistent water outlet temperature, reducing the risk of scalding injuries.

SUMMARY

Provided herein are extraction tools for removing thermostatic cartridges from the manifold of a valve. Servicing and/or replacing a thermostatic cartridge of a thermostatic valve can be a difficult task due in part to mineral buildup. As explained above, cartridges are generally tightly positioned within the manifold of the valve. Oftentimes, space is limited as well. For example, sometimes, the valve is deep behind the finished wall, making it very difficult for a user to grab the head of thermostatic cartridge to extract it. Further, space constraints can also make it difficult for a user to apply a conventional extraction tool to the cartridge without risk of damaging to the plastic cap of thermostatic cartridge Accordingly, the extraction tools described herein can allow a user to more easily remove a thermostatic cartridge from its manifold, reducing the amount of time, labor, and risk of injury or damage to the valve that is otherwise required to remove a thermostatic cartridge.

Extraction tools described herein include two components: a cap and a screw. When the thermostatic valve is mounted within a manifold of a thermostatic valve, a portion of the cartridge extends out of the valve manifold body. When the necessary parts are removed to expose the cartridge for servicing, the cap is designed to fit over this extending portion and rest against a rim or ledge of the opening of the manifold. The screw is designed to be inserted into an opening at the top of the cap. During an extraction process (i.e., when the extraction tool is used to extract a cartridge from its manifold), the screw is configured to screw into an opening comprising threads at the top of the cartridge.

To operate the extraction tool, a user must twist or screw the cap onto the cartridge such that the screw of the extraction tool screws into an opening located at the top of the cartridge. As the user continues to twist the cap, the screw will continue to screw into the cartridge, until the bottom rim of the cap is flush with a rim or ledge of the opening of the manifold, at which point any further twisting will cause the screw to pull up on the cartridge, pulling the cartridge out of the manifold. The material and architecture of the cap should be able to withstand the force of the screw pulling up on the cartridge as the user continues to twist the cap.

In some embodiments, provided is an extraction tool for removing a thermostatic cartridge from a valve assembly, the extraction tool comprising: a cap comprising an opening in a top surface of the cap; and a screw, wherein the cap is configured to receive the screw at the opening, and wherein, when the extraction tool is placed over a portion of a thermostatic cartridge installed in a valve assembly, an end of the screw is configured to screw into an opening of the thermostatic cartridge.

In some embodiments of the extraction tool, the cap comprises a domed top portion, and the opening is located at the topmost location of the domed top portion.

In some embodiments of the extraction tool, the cap comprises a cylindrical middle portion.

In some embodiments of the extraction tool, a radius of the cylindrical middle portion is equal to a radius of the domed top portion, wherein both the radius of the cylindrical middle portion and the radius of the domed top portion is measured from the outer surface of the cap.

In some embodiments of the extraction tool, the cap comprises a bottom portion having a circular opening, wherein the circular opening comprises a bottom rim configured to contact a manifold of the valve assembly when the extraction tool is in operation.

In some embodiments of the extraction tool, a radius of the bottom rim is greater than the radius of the domed top portion and the radius of the cylindrical middle portion.

In some embodiments of the extraction tool, a total height of the extraction tool is about 70-80 mm.

In some embodiments of the extraction tool, the radius of the domed top portion is about 15-25 mm.

In some embodiments of the extraction tool, the radius of the cylindrical middle portion is about 15-25 mm.

In some embodiments of the extraction tool, the radius of the bottom rim is about 20-30 mm.

In some embodiments of the extraction tool, a wall thickness of the extraction tool is about 1-3 mm.

In some embodiments of the extraction tool, when the extraction tool is configured to be twisted onto the thermostatic cartridge.

In some embodiments of the extraction tool, threads of the screw are configured to engage with threads of the opening of the thermostatic cartridge.

In some embodiments of the extraction tool, the cap comprises one of polyethylene, polycarbonate, polyamide, polypropylene, polyamide, polycarbonate, polylmethyl (meth)acrylate, or acrylonitrile butadiene styrene.

In some embodiments, any one or more of the features, characteristics, or elements discussed above with respect to any of the embodiments may be incorporated into any of the other embodiments mentioned above or described elsewhere herein.

DETAILED DESCRIPTION

Figure 1:
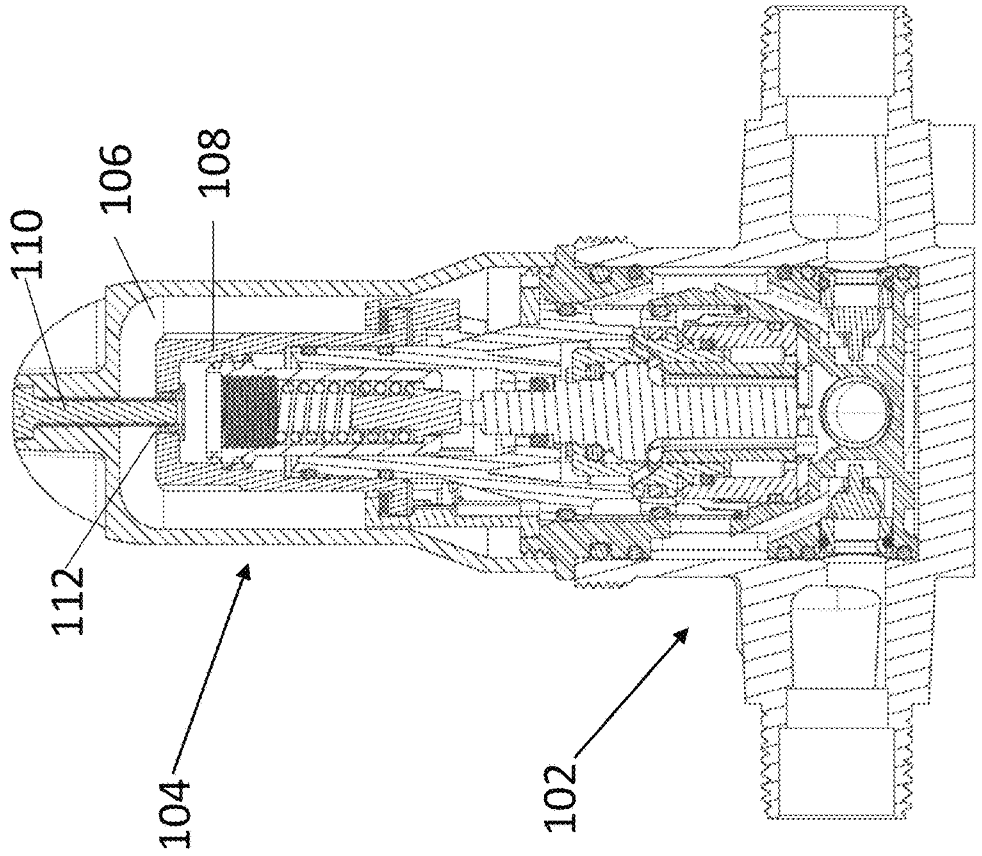
FIG. 1 shows a cross-sectional view of a thermostatic valve assembly with an attached extraction tool, according to some embodiments.

Described herein are extraction tools for removing thermostatic cartridges from the manifold of a valve assembly. A thermostatic valve is designed to mix inlet hot water and inlet cold water to a consistent and predetermined temperature. Over time, the cartridge of the valve may need to be removed from the valve assembly for service and/or replacement. However, oftentimes, the valve assembly is located in a tight space, which can make it difficult for a user to access the valve. Space constraints can also make it more difficult for a user to remove the cartridge using a conventional extraction tool without damaging the cartridge.

Accordingly, extraction tools provided herein can more easily and more efficiently remove a thermostatic cartridge from the valve assembly. The extraction tools include a cap component and a screw component, and utilizes existing female threads within the thermostatic cartridge to be removed. When actively removing a cartridge from a valve assembly, a user simply twists the cap until the screw is completely inserted into the opening at the top of the cartridge (i.e., when the bottom rim of the cap component is in contact and flush with a rim or ledge surface of the cartridge opening of the valve assembly). At this point, the user will continue to twist the cap such that the rotation of the screw in the opening of the cartridge exerts an upward force on the cartridge, and pulls the cartridge out of the valve assembly.

Referring now to the drawings, like parts are marked throughout the specification and drawings with the same reference numerals, respectively.

FIG. 1 shows a cross-sectional view of a thermostatic valve assembly 102 with an attached extraction tool 104, according to some embodiments. As shown in the figure, extraction tool is mounted on top of valve assembly 102. Space 106 is located between an interior surface of extraction tool 104 and the outer surface of cartridge 108. When a portion of the valve assembly is disassembled such that the cartridge is exposed and accessible, a portion of the cartridge extends out of the manifold of the valve assembly. This allows the extraction tool 104 to be mounted over the exposed portion of cartridge 108.

One of the components of extraction tool 104, screw 110, is shown in the figure completely screwed into the opening 112 of cartridge 108 such that a bottom rim of extraction tool 104 is flush with a rim of an opening of the valve assembly 102.

Figure 2:
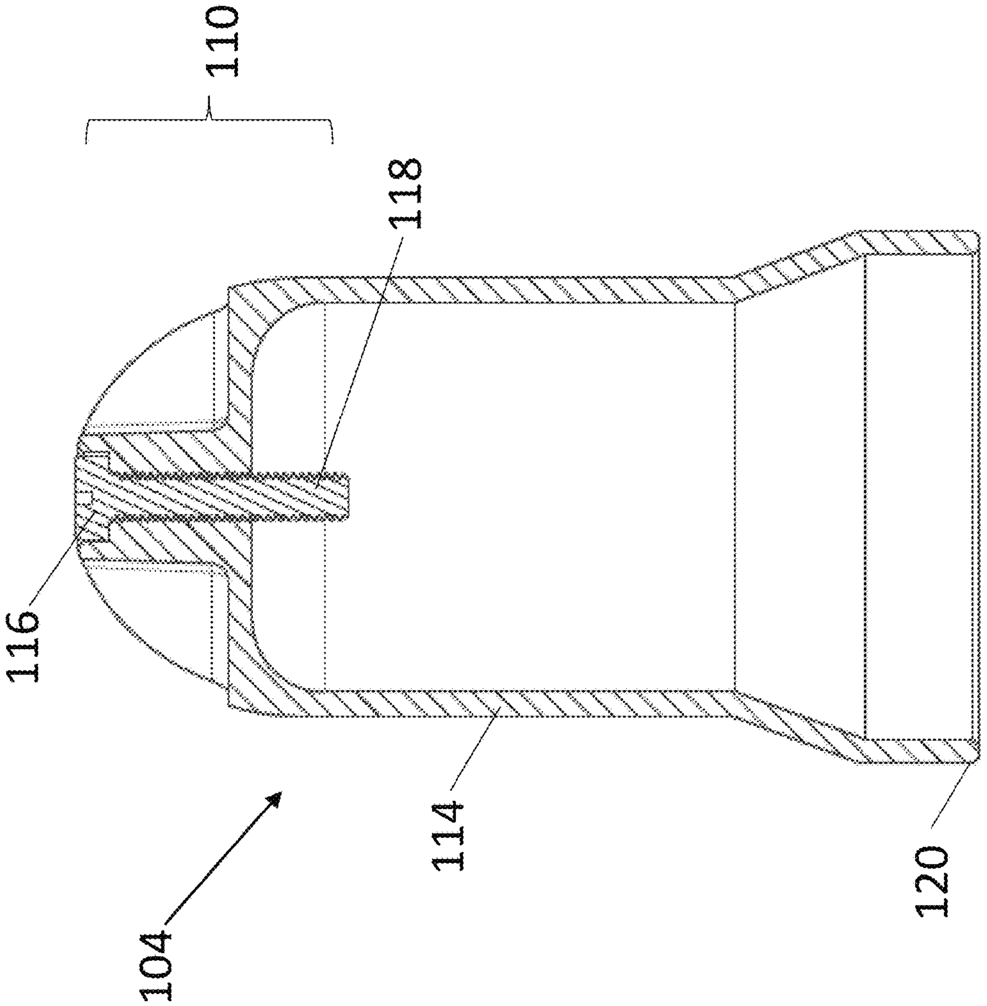
FIG. 2 shows a cross-sectional view of an extraction tool, according to some embodiments.

FIG. 2 shows a cross-sectional view of an extraction tool 104, according to some embodiments. As shown, extraction tool 104 includes a cap component 114 and a screw 110. The figure specifically shows the screw 110 completely inserted into the cap 114. In some embodiments, when the screw 110 is completely inserted into the cap 114, the head 116 of the screw 110 is embedded into the top of the cap 114 such that a topmost surface of the head 116 is flush with a topmost surface of the cap 114. The end 118 of screw 110 extends into an interior space formed by the cap 114. A lower edge or rim 120 of cap 114 is configured to rest against a manifold or other component of the valve assembly housing the thermostatic cartridge to be removed from the valve assembly when the extraction tool 104 is completed inserted over an exposed thermostatic cartridge.

Figure 3:
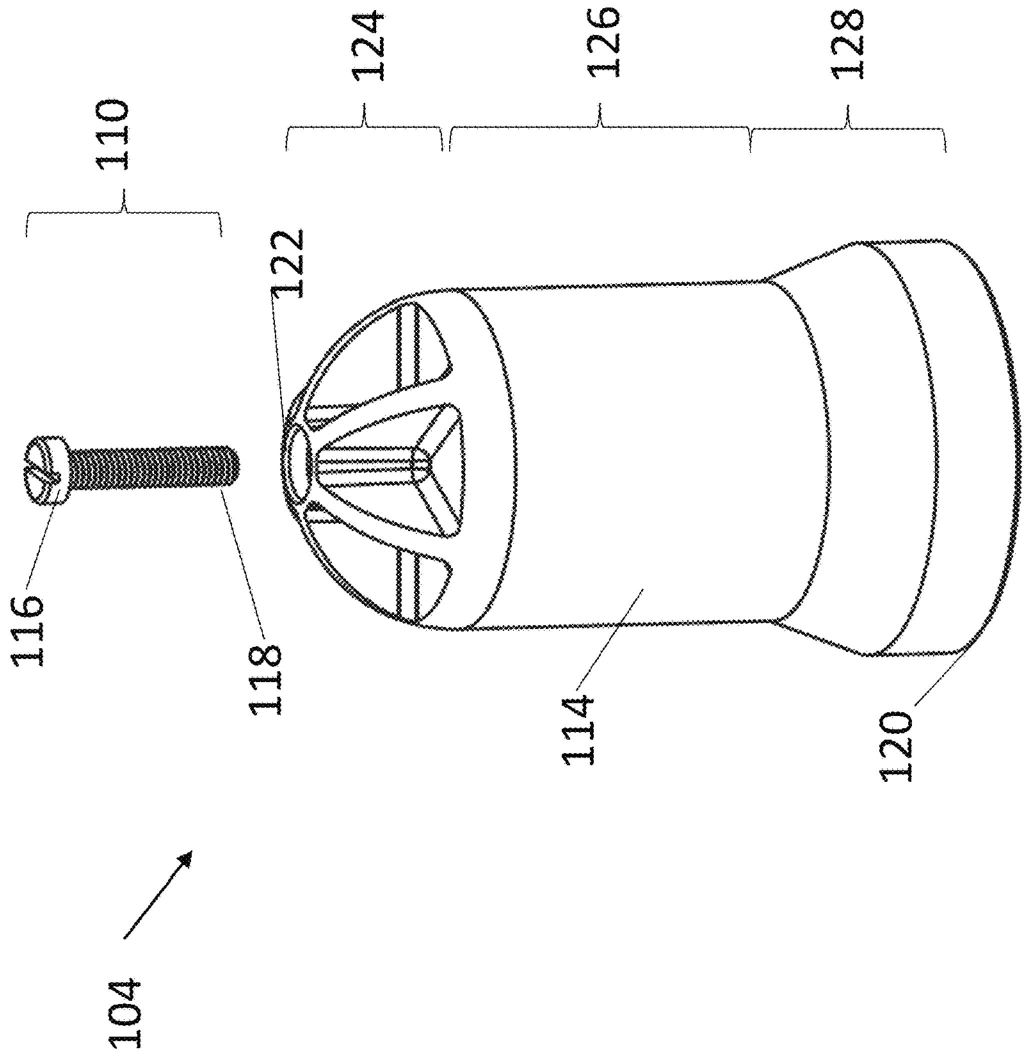
FIG. 3 shows an exploded view of an extraction tool, according to some embodiments.

FIG. 3 shows an exploded view of an extraction tool 104, according to some embodiments. As shown, extraction tool 104 includes two components, a cap 114 and a screw. The screw includes a head 116 and an end 118. The end is configured to be screwed into a top opening 122 of cap 114, and then into an opening having threads at the top of a thermostatic cartridge to be removed from its valve assembly. In some embodiments, the cap 114 may have a general bell shape. In some embodiments, cap 114 may include a top portion 124, a middle portion 126, and a bottom portion 128. The top portion 124 may approximate a half-sphere in shape and comprise an opening 122 at the top to receive the screw 110. In some embodiments, the middle portion 126 may be cylindrical in shape. In some embodiments, the radius of the bottom of middle portion 126 may be the same as the radius of the top of middle portion 126. In some embodiments, the middle portion 126 may be frustum-shaped, such that the radius of the bottom of middle portion is greater than the radius of the top of middle portion 126. Bottom portion 128 of cap 114 may comprise a rim 120 configured to rest atop a surface of a valve assembly (e.g., manifold) when removing a thermostatic cartridge from the valve assembly. In some embodiments, the radius of the rim 120 is greater than the radius of the bottom and/or top of middle portion 126. In some embodiments, the radius of the rim 120 is the same as the bottom and/or the top of middle portion 126. In some embodiments, the bottom portion 128 extends outward from the middle portion 126. For example, bottom portion 128 may comprise a portion with an angled surface (i.e., not vertical or horizontal).

Figure 4:
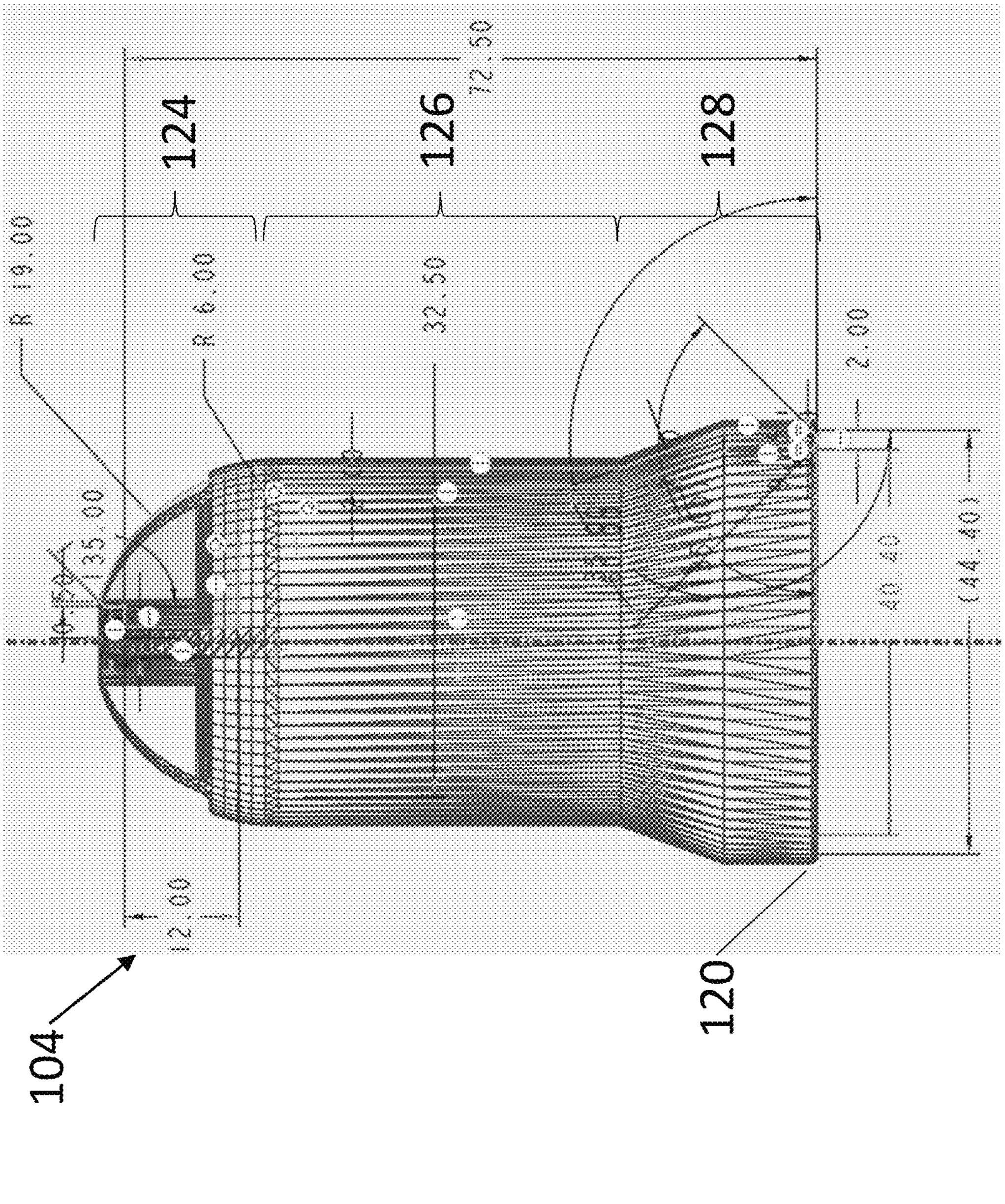
FIG. 4 shows a line drawing of an extraction tool, according to some embodiments.

FIG. 4 shows a line drawing of an extraction tool 104 having a top portion 124, a middle portion 126, and a bottom portion 128, according to some embodiments. As shown, the figure includes example dimensions that may be suitable for some thermostatic cartridges in some embodiments.

In some embodiments, the radius of the top portion 124 of extraction tool 104 (as measured from the outer surface of top portion 124) may be about 12-30, about 14-24, or about 16-20 mm. In some embodiments, the radius of the top portion 124 of extraction tool 104 may be less than or equal to about 30, about 28, about 26, about 24, about 22, about 20, about 18, about 16, or about 14 mm. In some embodiments, the radius of the top portion 124 of extraction tool 104 may be greater than or equal to about 12, about 14, about 16, about 18, about 20, about 22, about 24, about 26, or about 28 mm.

In some embodiments, the radius of middle portion 126 of extraction tool 104 (as measured from the outer surface of middle portion 126) may be about 12-34, about 14-28, or about 14-22 mm. In some embodiments, the radius of the middle portion 126 of extraction tool 104 may be less than or equal to about 34, about 32, about 30, about 28, about 26, about 24, about 22, about 20, about 18, about 16, or about 14 mm. In some embodiments, the radius of the middle portion 126 of extraction tool 104 may be greater than or equal to about 12, about 14, about 16, about 18, about 20, about 22, about 24, about 26, about 28, about 30, or about 32 mm.

In some embodiments, the radius of rim 120 of bottom portion 128 of extraction tool 104 (as measured from the outer surface of the rim 120 of bottom portion 128) may be about 14-40, about 16-30, or about 20-26 mm. In some embodiments, the radius of rim 120 of bottom portion 128 of extraction tool 104 may be less than or equal to about 40, about 38, about 36, about 34, about 32, about 30, about 28, about 26, about 24, about 22, about 20, about 18, or about 16 mm. In some embodiments, the radius of rim 120 of bottom portion 128 of extraction tool 104 may be greater than or equal to about 14, about 16, about 18, about 20, about 22, about 24, about 26, about 28, about 30, about 32, about 34, about 36, or about 38 mm.

In some embodiments, the thickness of an outer wall of middle portion 126 and/or bottom portion 128 may be about 0.5-8, about 1-6, or about 1-4 mm. In some embodiments, the thickness of an outer wall of middle portion 126 and/or bottom portion 128 may be less than or equal to about 8, about 7, about 6, about 5, about 4, about 3, about 2, or about 1 mm. In some embodiments, the thickness of an outer wall of middle portion 126 and/or bottom portion 128 may be greater than or equal to about 0.5, about 1, about 2, about 3, about 4, about 5, about 6, or about 7 mm.

In some embodiments, the total height of extraction tool 104 may be about 50-100, about 60-90, or about 70-80 mm. In some embodiments, the total height of extraction tool 104 may be less than or equal to about 100, about 95, about 90, about 85, about 80, about 75, about 70, about 65, about 60, or about 55 mm. In some embodiments, the total height of extraction tool 104 may be greater than or equal to about 50, about 55, about 60, about 65, about 70, about 75, about 80, about 85, about 90, or about 95 mm.

In some embodiments, extraction tool 104 includes a screw of size M4×0.7×25 mm long. In some embodiment, the screw is overmolded onto the cap of the extraction tool 104. In some embodiments, the cap can comprise thermoplastics such as Polyethylene, Polycarbonate, Polyamide (Nylon), Polypropylene, etc., as well as engineering plastics, including polyamides (PA), polycarbonates (PC), polylmethyl(meth)acrylate (PMMA), and acrylonitrile butadiene styrene (ABS).

Figure 5:
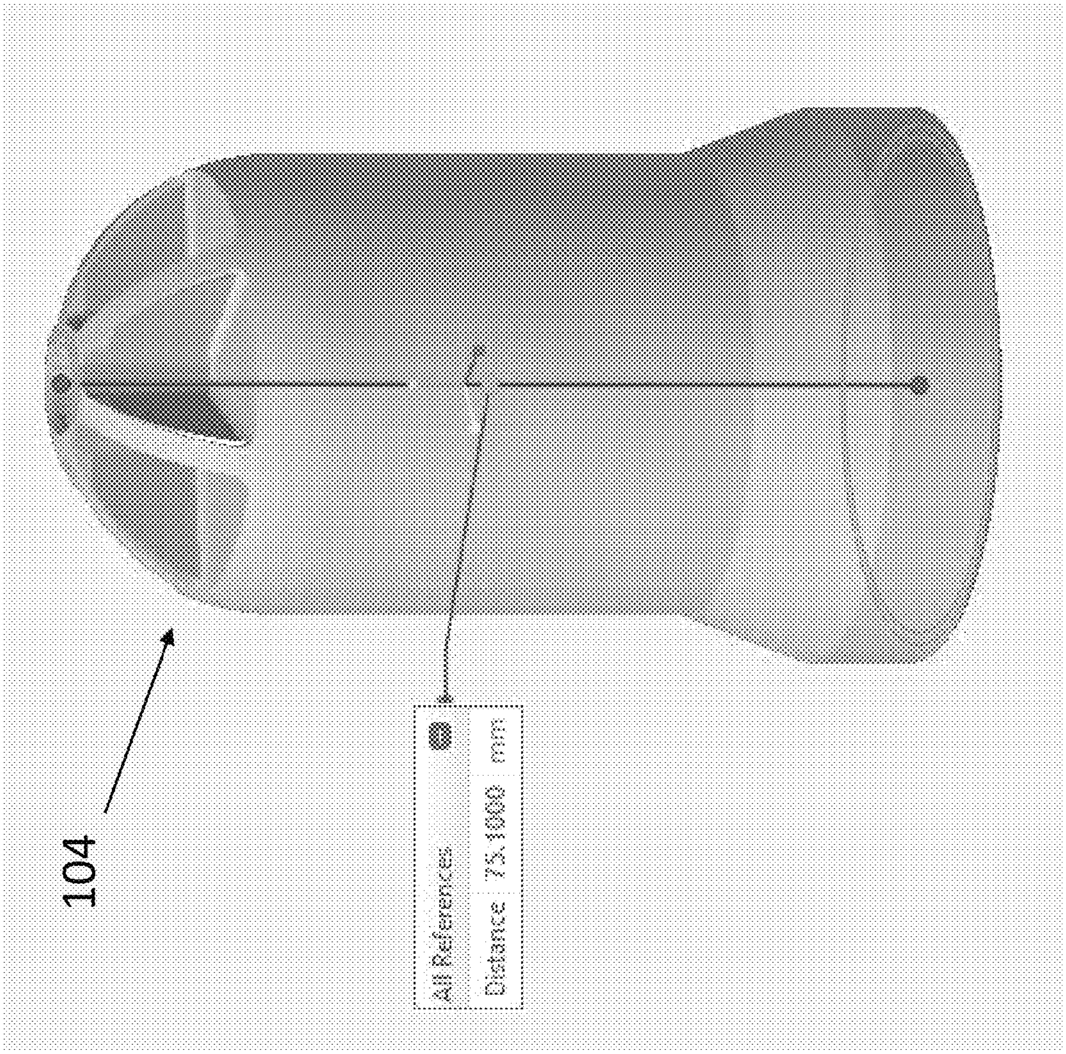
FIG. 5 shows a rendering of an extraction tool, according to some embodiments.

FIG. 5 shows a rendering of an extraction tool 104, according to some embodiments. The embodiment depicted in this Figure shows a total height of 75.1 mm.

Figure 6:
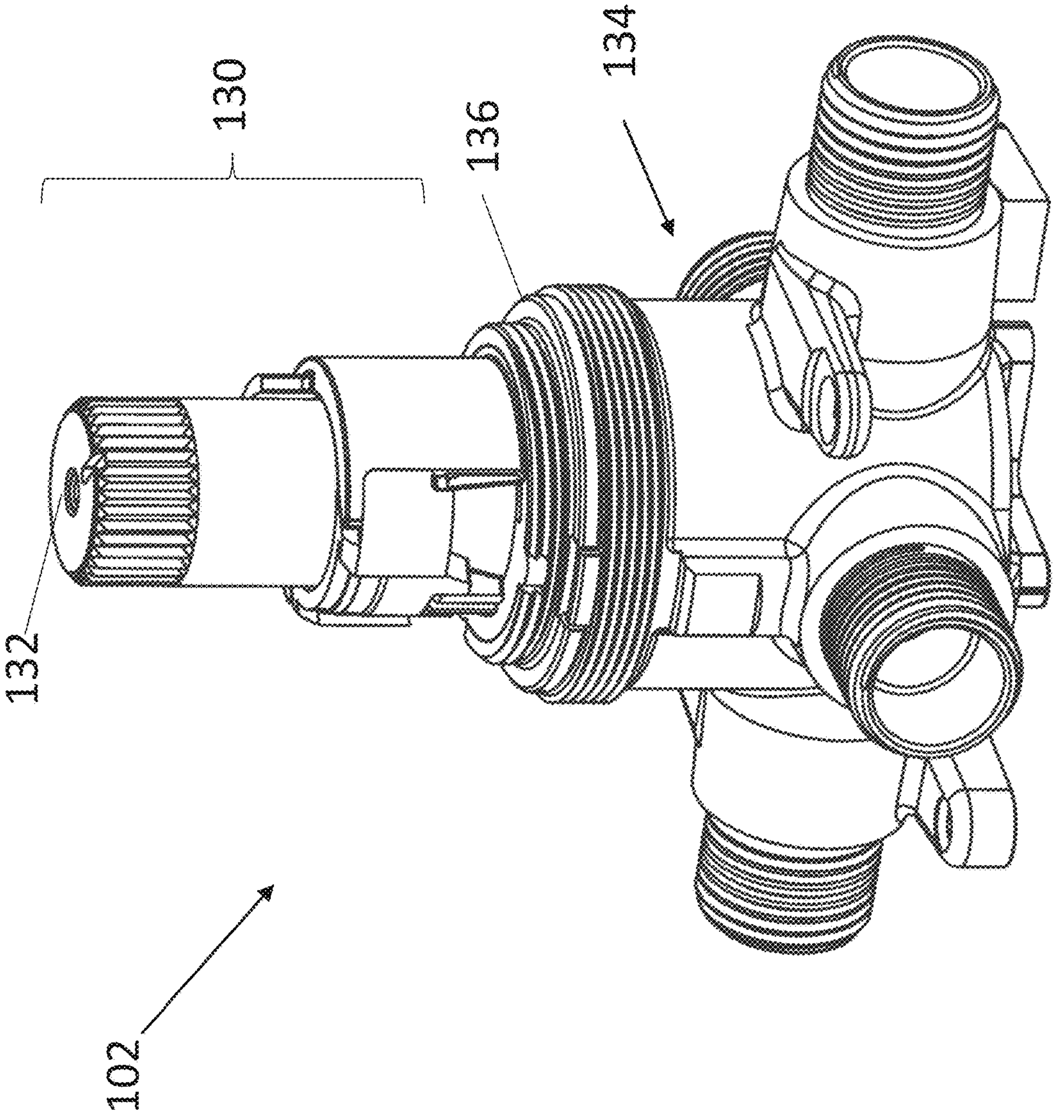
FIG. 6 shows a perspective view of a thermostatic cartridge in a rough-in valve, according to some embodiments.

FIG. 6 shows a perspective view of a valve assembly 102 including thermostatic cartridge 130, according to some embodiments. As shown, thermostatic cartridge 130 is exposed and extends upwards out of housing 134 for operation. This allows a user to insert an extraction tool to remove the thermostatic cartridge 130 from the remaining components (e.g., manifold, housing 134) of the valve assembly 102. The screw of an extraction tool is configured to screw into opening 132. Opening 132 of thermostatic cartridge 130 is provided for a handle to couple and tighten to, such that the handle can control the thermostatic cartridge 130. In some embodiments, opening 132 comprises female threads configured to mate with male threads of the screw of an extraction tool. Once the extraction tool is completely installed/inserted onto the thermostatic cartridge 130, such that the bottom rim of the extraction tool is in contact with a top surface of a part of the valve assembly 102 (e.g., manifold surface 136), the force of the screw continuing to twist into opening 132 without being able to move downwards any further into opening 132 (due to the cap of the extraction tool being fully up against the valve assembly 102) pulls the thermostatic cartridge 130 up and out of the valve assembly 102. When removed, the thermostatic cartridge 130 and the extraction tool may be connected as a single unit.

Figure 7:
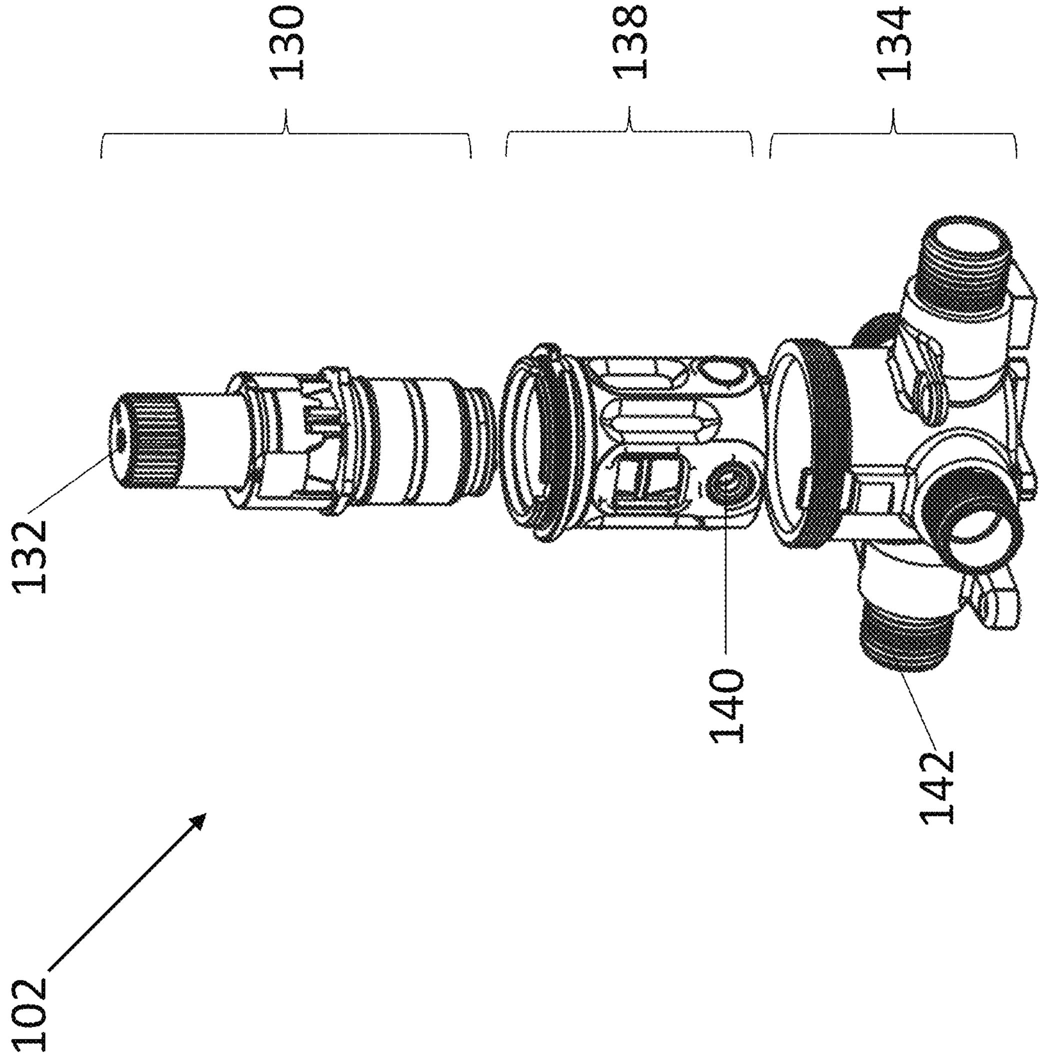
FIG. 7 shows an exploded view of a valve assembly, according to some embodiments.

FIG. 7 shows an exploded view of a valve assembly 102, according to some embodiments. As shown, the valve assembly 102 includes a housing 134, manifold 138 that is configured to partially be inserted into housing 134, and thermostatic cartridge 130 that is configured to be partially inserted into manifold 138. Thermostatic cartridge 130 includes an opening 132 configured to receive a screw of an extraction tool. Housing 134 includes a plurality of waterway openings 142 configured to fluidly couple to inlet and/or outlet hoses (e.g., cold water inlet hose, hot water inlet hose, mixed water outlet hose). Manifold 138 includes a plurality of openings 140, each of which corresponds to a waterway opening 142 of the housing 134. The openings 140 allow the water to flow into and out of the manifold 138 and thermostatic cartridge 130.

Figure 8:
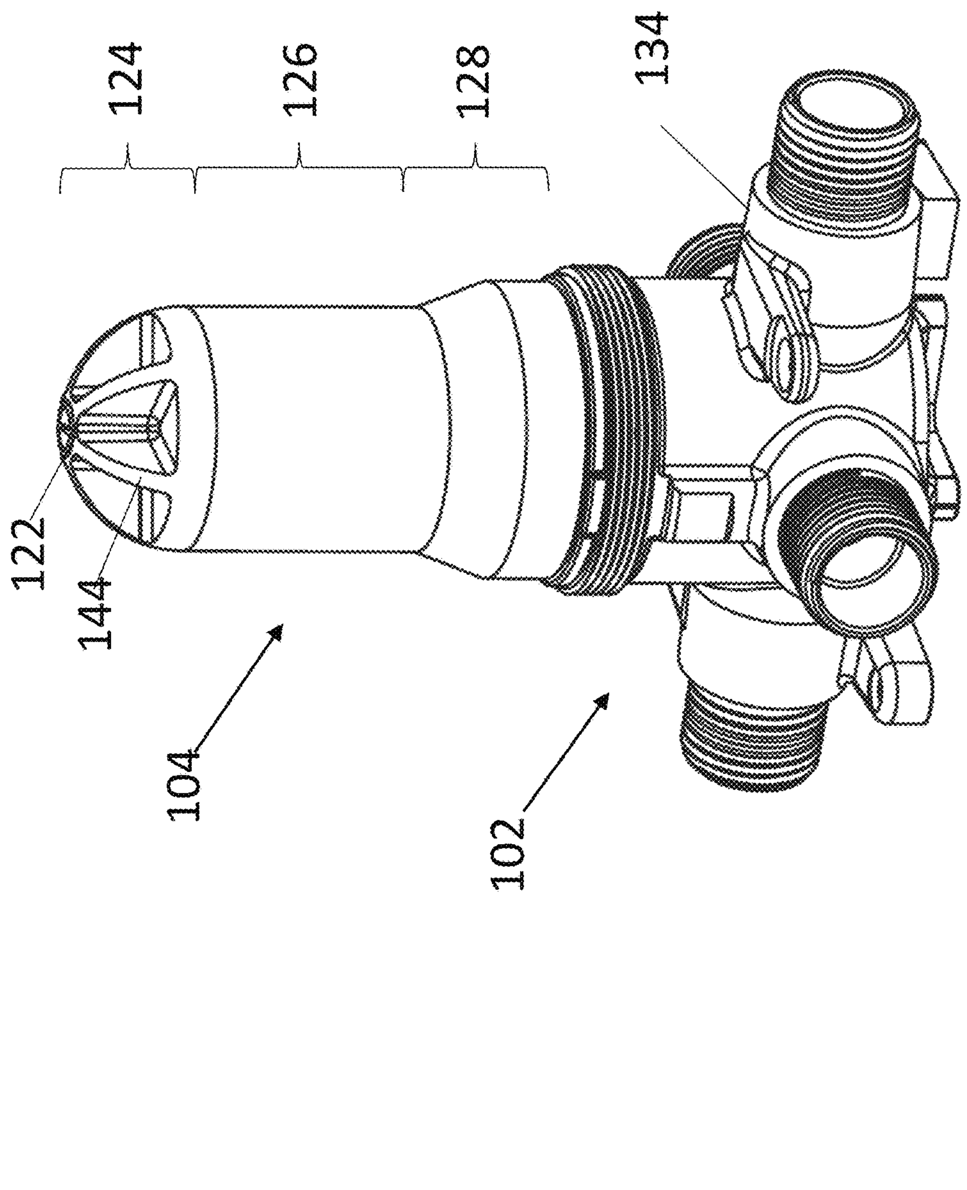
FIG. 8 shows a perspective view of a thermostatic cartridge in a rough-in valve and an extraction tool positioned on top of the thermostatic cartridge, according to some embodiments.

FIG. 8 shows a perspective view of a valve assembly 102 and an extraction tool 104 positioned on top of the thermostatic cartridge, according to some embodiments. The extraction tool 104 includes a cap having a top portion 124, a middle portion 126, and a bottom portion 128. The domed or semi-circle top portion 124 may comprise a plurality of ribs extending from a bottom edge of the top portion 124 (proximate to the middle portion 126) and extending upwards towards the opening 122.

Figure 9B:
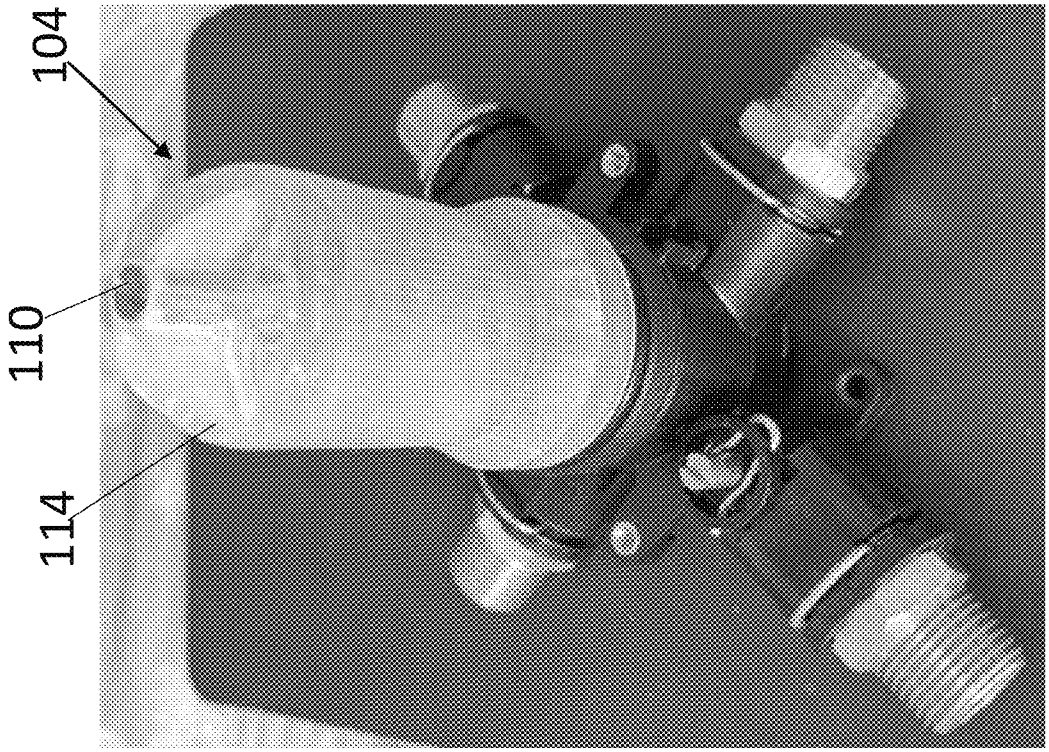
FIG. 9B shows an image of an extraction tool positioned over a thermostatic cartridge of a rough-in valve, according to some embodiments.
Figure 9A:
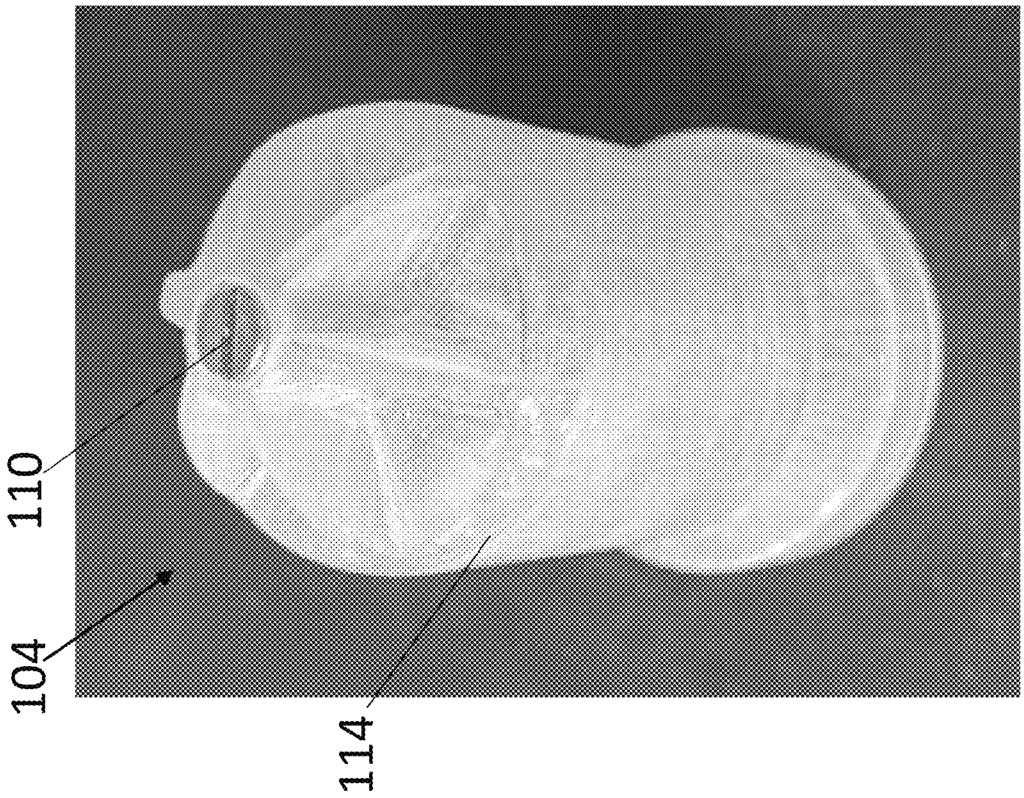
FIG. 9A shows an image of an extraction tool, according to some embodiments.

FIG. 9A shows an image of an extraction tool 104 comprising a cap 114 and a screw 110, according to some embodiments. FIG. 9B shows an image of an extraction tool 104 positioned over a thermostatic cartridge of a rough-in valve assembly, according to some embodiments.

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. An extraction tool for removing a thermostatic cartridge from a valve assembly, the extraction tool comprising:

a cap comprising an opening in a top surface of the cap and a circular opening in a bottom portion of the cap, wherein the circular opening comprises a bottom rim configured to contact a manifold of the valve assembly when the extraction tool is in operation; and a screw, wherein the cap is configured to receive the screw at the opening, wherein, when the extraction tool is placed over a portion of a thermostatic cartridge installed in a valve assembly, an end of the screw is configured to screw into an opening of the thermostatic cartridge, wherein, when the bottom rim of the cap comes in contact with the opening of the thermostatic cartridge, rotation of the screw exerts a force on the thermostatic cartridge that lifts the thermostatic cartridge from the valve assembly.

2. The extraction tool of claim 1, wherein the cap comprises a domed top portion, and the opening is located at the topmost location of the domed top portion.

3. The extraction tool of claim 1, wherein the cap comprises a cylindrical middle portion.

4. The extraction tool of claim 3, wherein a radius of the cylindrical middle portion is equal to a radius of the domed top portion, wherein both the radius of the cylindrical middle portion and the radius of the domed top portion is measured from the outer surface of the cap.

5. The extraction tool of claim 4, wherein the radius of the cylindrical middle portion is about 15-25 mm.

6. The extraction tool of claim 1, wherein a radius of the bottom rim is greater than the radius of the domed top portion and the radius of the cylindrical middle portion.

7. The extraction tool of claim 6, wherein the radius of the bottom rim is about 20-30 mm.

8. The extraction tool of claim 1, wherein a total height of the extraction tool is about 70-80 mm.

9. The extraction tool of claim 1, wherein the radius of the domed top portion is about 15-25 mm.

10. The extraction tool of claim 1, wherein a wall thickness of the extraction tool is about 1-3 mm.

11. The extraction tool of claim 1, wherein the extraction tool is configured to be twisted onto the thermostatic cartridge.

12. The extraction tool of claim 1, wherein threads of the screw are configured to engage with threads of the opening of the thermostatic cartridge.

13. The extraction tool of claim 1, wherein the cap comprises one of polyethylene, polycarbonate, polyamide, polypropylene, polyamide, polycarbonate, polylmethyl (meth)acrylate, or acrylonitrile butadiene styrene.

* * * * *